J. F. GAIL.
EDGE BAND MACHINE.
APPLICATION FILED FEB. 7, 1916.
1,297,340.
Patented Mar. 18, 1919.
9 SHEETS—SHEET 1.
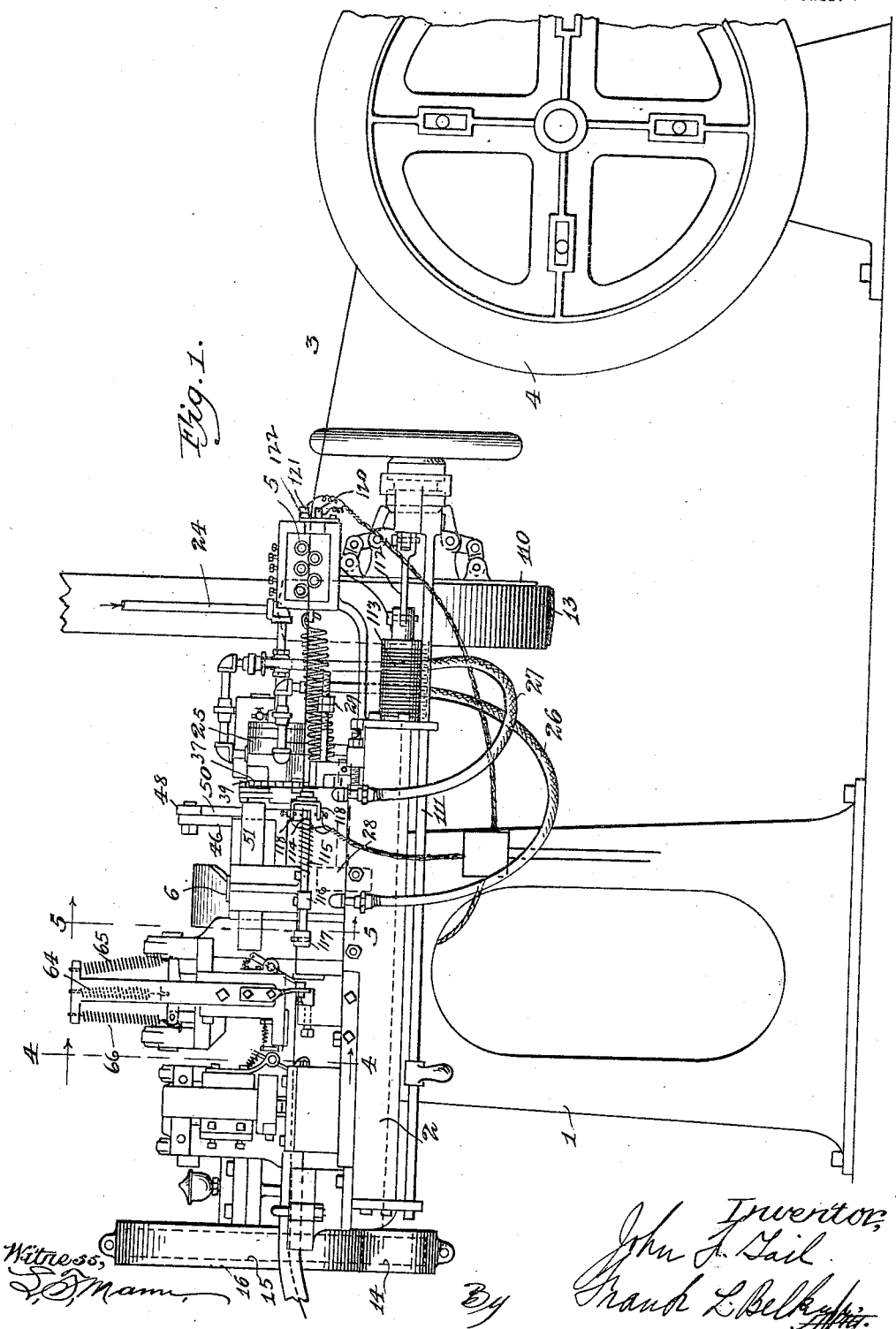

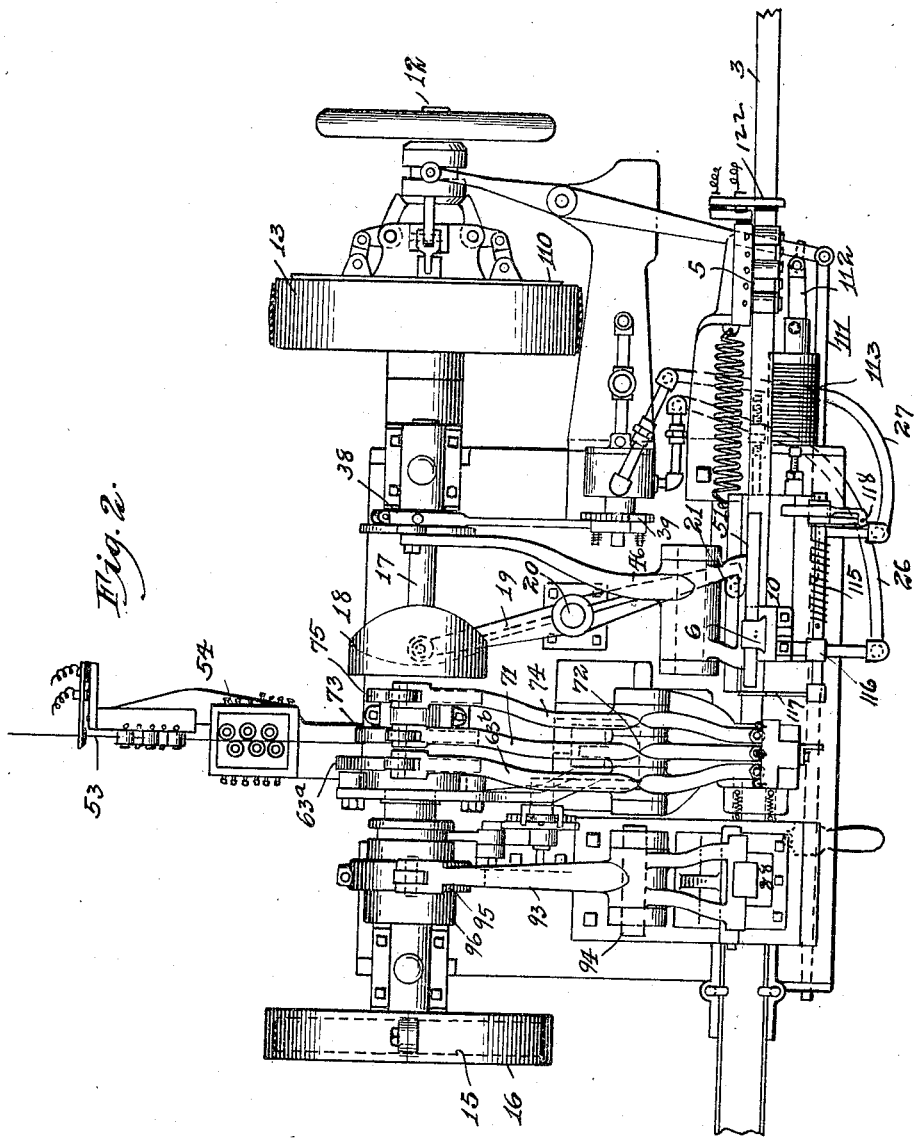

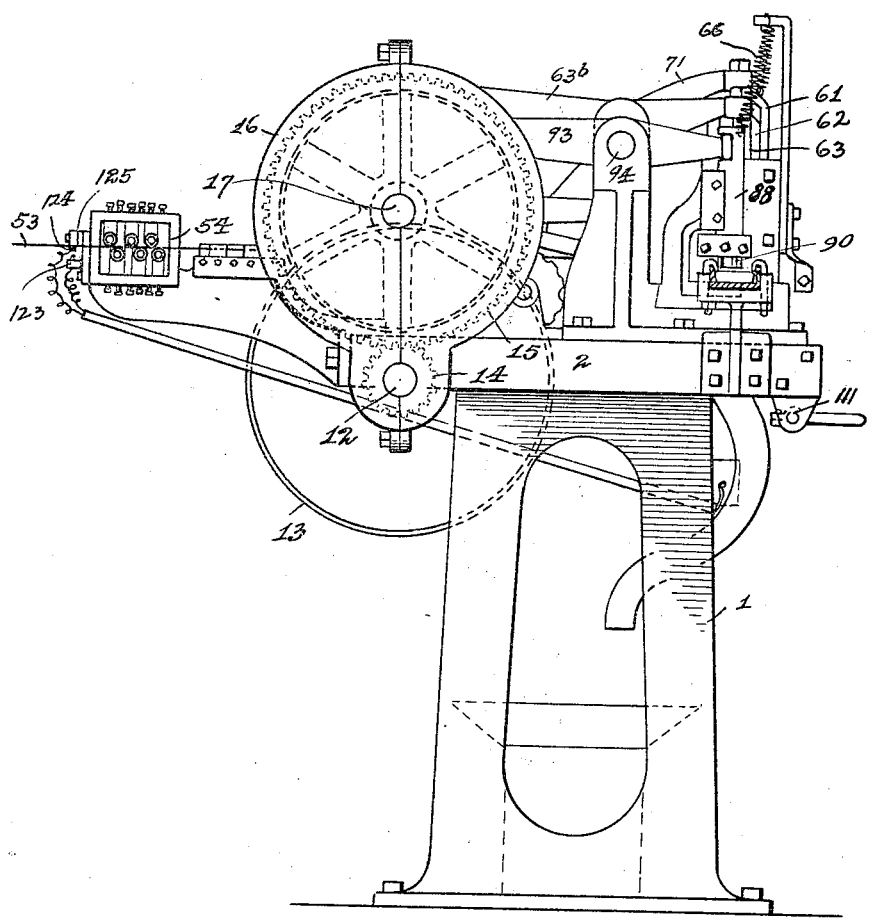

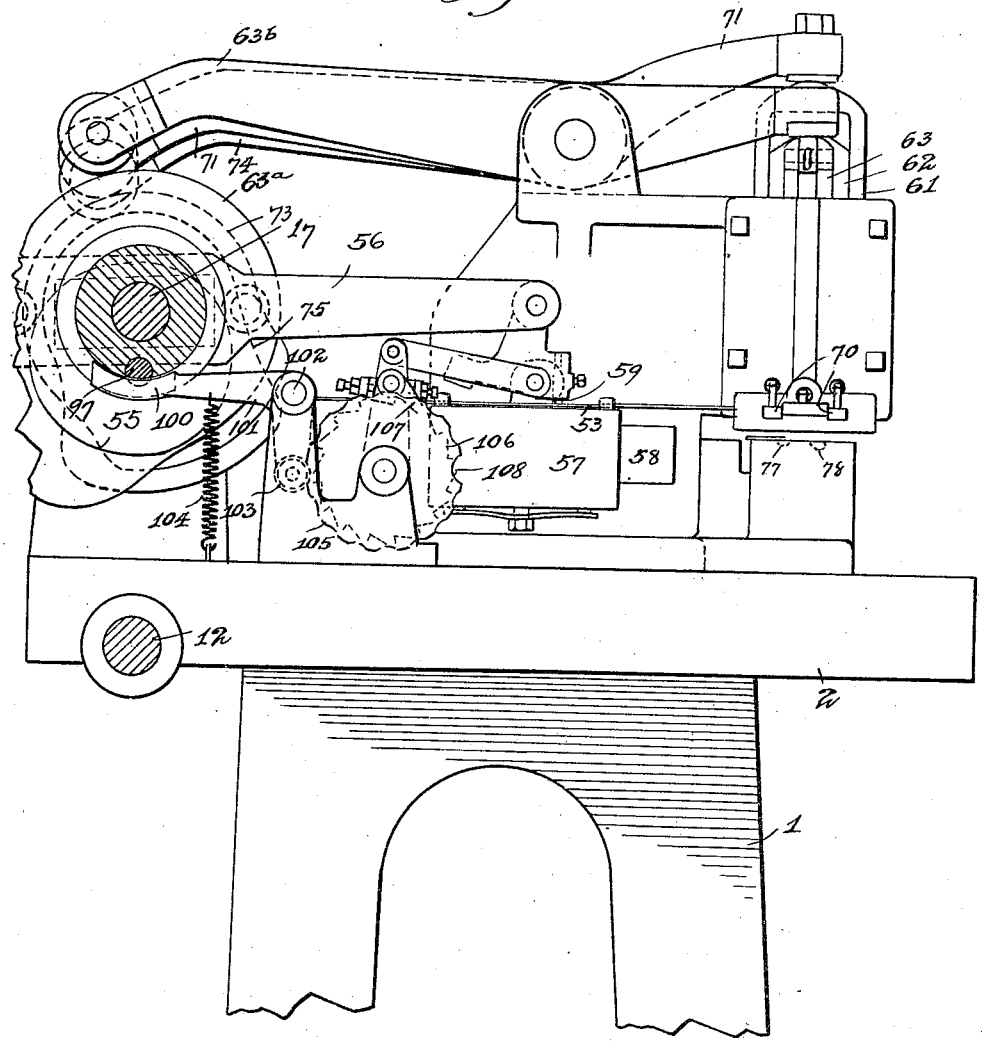

J. F. GAIL.
EDGE BAND MACHINE.
APPLICATION FILED FEB. 7, 1916.

1,297,340.

Patented Mar. 18, 1919.
9 SHEETS—SHEET 5.

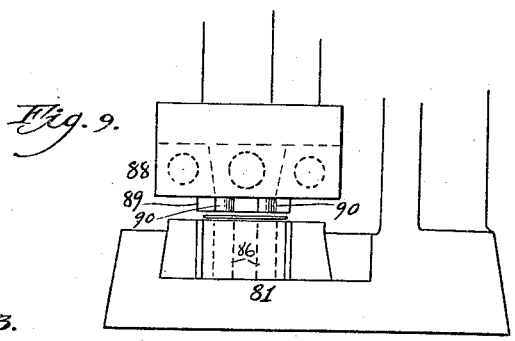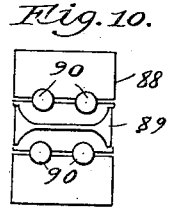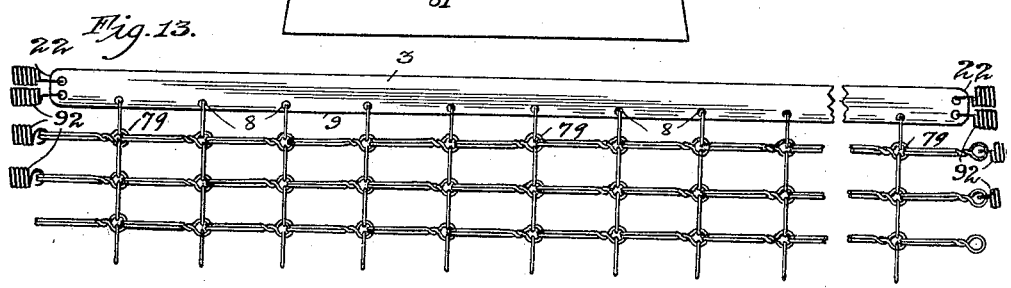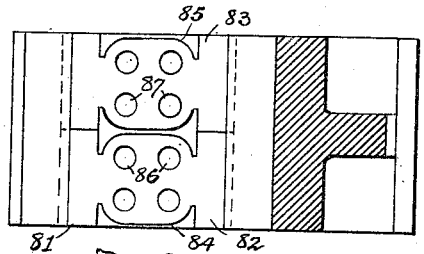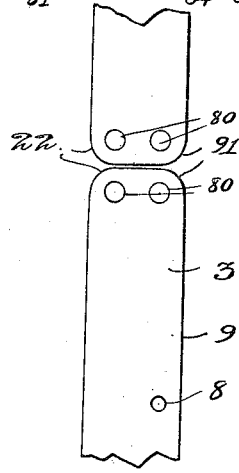

J. F. GAIL.
EDGE BAND MACHINE.
APPLICATION FILED FEB. 7, 1916.

1,297,340.

Patented Mar. 18, 1919.
9 SHEETS—SHEET 7.

Witness,
J. D. Mann

Inventor,
John F. Gail
Frank L. Belknap
Atty.

J. F. GAIL.
EDGE BAND MACHINE.
APPLICATION FILED FEB. 7, 1916.
1,297,340.
Patented Mar. 18, 1919.
9 SHEETS—SHEET 8.
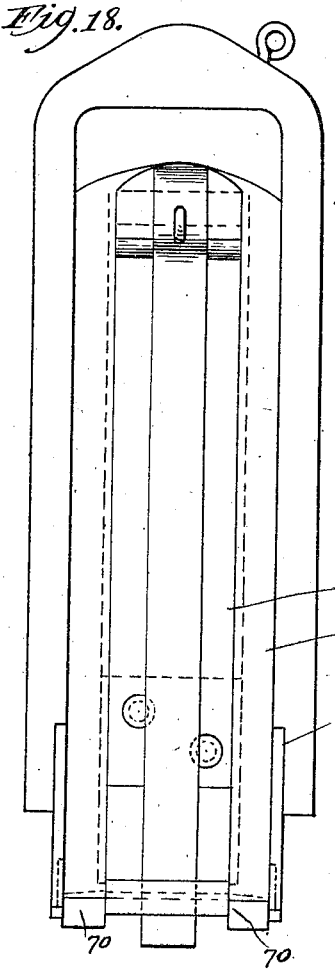
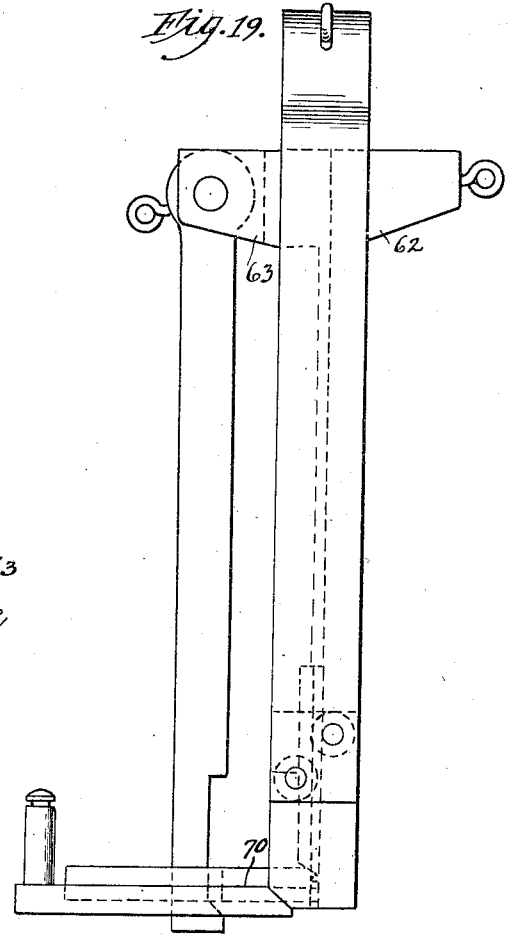
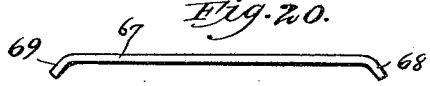
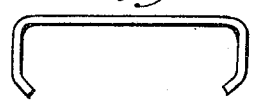
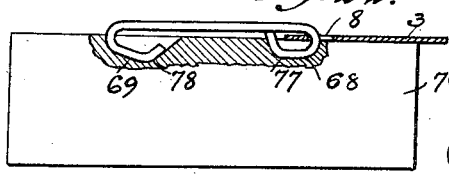

J. F. GAIL.
EDGE BAND MACHINE.
APPLICATION FILED FEB. 7, 1916.
1,297,340.
Patented Mar. 18, 1919.
9 SHEETS—SHEET 9.
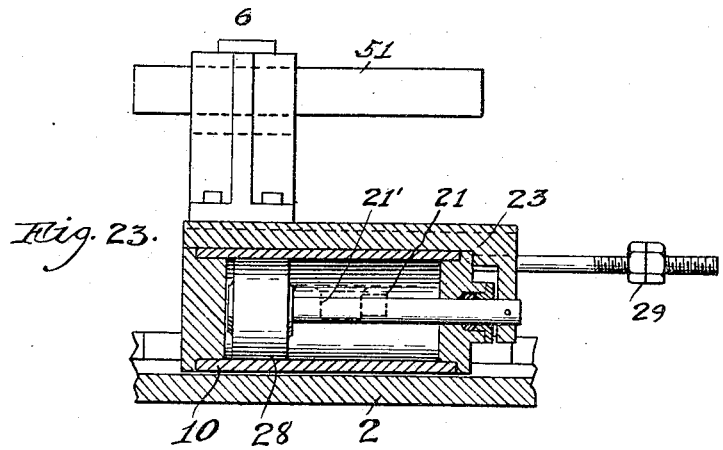
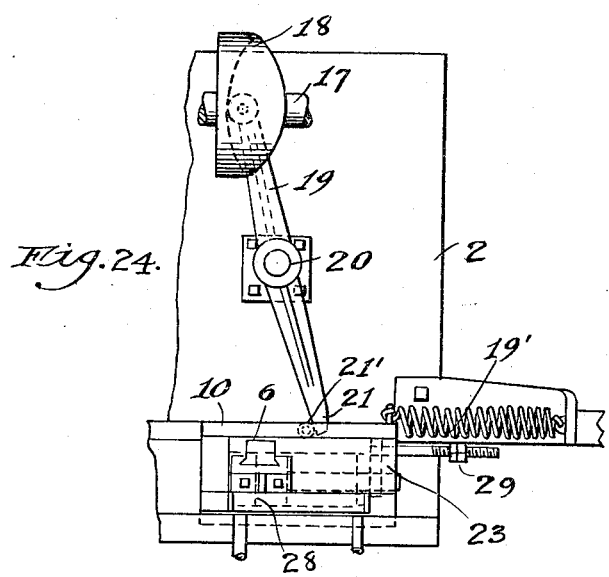
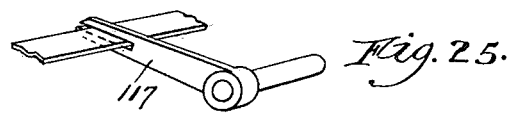
Witness,
S. B. Mann
Inventor,
John F. Gail
By Frank L. Belknap
Atty.

UNITED STATES PATENT OFFICE.

JOHN F. GAIL, OF KENOSHA, WISCONSIN, ASSIGNOR, BY MESNE ASSIGNMENTS, TO SIMMONS COMPANY, OF KENOSHA, WISCONSIN, A CORPORATION OF DELAWARE.

EDGE-BAND MACHINE.

1,297,340.  Specification of Letters Patent.  Patented Mar. 18, 1919.

Application filed February 7, 1916. Serial No. 76,577.

*To all whom it may concern:*

Be it known that I, JOHN F. GAIL, a citizen of the United States, residing in the city of Kenosha, county of Kenosha, and State of Wisconsin, have invented certain new and useful Improvements in Edge-Band Machines, of which the following is a specification.

This invention relates to improvements in edge band machines and refers more particularly to a machine for forming the band edges and cross connecting links of a spring fabric and automatically connecting the links to the bands.

Among the salient objects of the invention are to provide novel means for punching band blanks and severing them into their proper lengths and simultaneously forming the cross connecting links and uniting them to the punched portions of the bands; to provide mechanism for forming a novel type of link which is so formed and secured in position as to obviate any tendency to catch in the bed clothing or the like; to provide a novel method of forming the link and attaching the same to the band; to provide means for automatically securing the preformed links to said band edges; to provide a construction in which the bands and links are respectively formed from continuous stock or reels and in which the various operating mechanisms are so timed that as the bands are punched and fed forward the links are formed and simultaneously secured to the bands in proper relation; to provide a construction for preventing the formation of a link receiving hole at the point where the bands are severed without interrupting the feed of the bands; to provide a construction in which the last mentioned object may be accomplished by lengthening at predetermined intervals, the throw of the punching mechanism which forms the link receiving holes in the bands; to provide a construction in which with slight changes in the machine, the operating mechanisms can be adjusted to form the corresponding link receiving holes, a greater or less distance apart than that shown in the drawings; to provide a construction in which all of the operations above referred to are automatically performed as long as the stock lasts and no manual operation or control is necessary other than the initial supplying of the stock in starting the machine; and in general to provide a simple and improved construction of the character referred to.

In the drawings:

Figure 1 is a side elevation of a machine embodying my invention.

Fig. 2 is a top plan view of the machine shown in Fig. 1.

Fig. 3 is an end elevation of the machine.

Fig. 4 is an enlarged section taken on the line 4—4 of Fig. 1, parts being omitted for the sake of clearness.

Fig. 9 is an enlarged side elevation of the mechanism for severing the bands and forming the holes for the helical spring connection.

Fig. 10 is an inverted plan view of the punch mechanism shown in Fig. 9.

Fig. 11 is a top plan view of the die mechanism, shown in Fig. 9.

Fig. 12 is a fragmentary plan view showing the adjacent ends of two of the severed bands.

Fig. 13 is a fragmentary top plan view showing the manner of assembling the bands with the spring fabric.

Fig. 18 is a side elevation of the mechanism for forming the connecting link.

Fig. 19 is a side elevation, taken at right angles to Fig. 18 of the parts shown therein.

Figs. 20 and 21 are views of the link in various stages of its formation.

Fig. 22 shows the link being attached to the band.

Fig. 23 is a sectional detail view of a traveling carriage.

Fig. 24 is a fragmentary plan view with parts shown in dotted lines showing the manner of reciprocating the carriage.

Fig. 25 is a fragmentary detail perspective view of a portion of the automatic stop mechanism.

Figure 7:
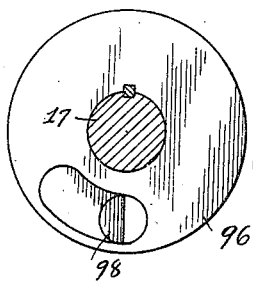
Figs. 6, 7 and 8 are enlarged detail views of the clutch mechanism for the wire feed.
Figure 6:
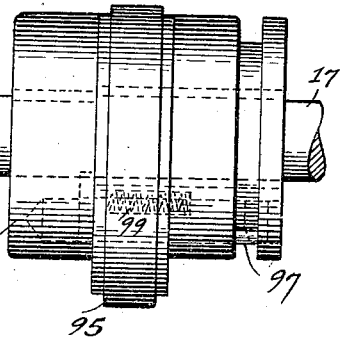
Figure 8:
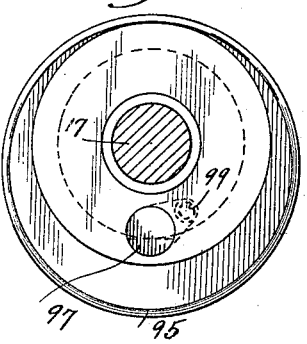

The machine hereinafter described in detail is particularly adapted for the automatic formation of bands such as are used at the edge portions of a bed bottom fabric and the invention contemplates a machine capable of forming the bands from a reel or other strip stock and automatically forming and attaching the links which are used to connect the edge bands with the spring fabric. These links are preferably each provided with their free end partially closed so that in attaching the band to the fabric it is only necessary to insert the free ends of the fabric into the open loop of the link and close the latter. Thus at one complete operation of a unitary structure the bands and links are formed and assembled.

Describing in detail the particular embodiment of my invention shown in the drawings, 1 designates the supporting frame and 2 the bed which carries the operating mechanisms for forming the bands and links and partially assembling them. In general the machine comprises the following mechanisms adapted to produce a completed product by the various steps enumerated: 1. The formation of the link receiving apertures. 2. The feeding forward of the band; and in the particular machine shown, the punching elements are used as the feeding elements. 3. The feeding of the wire stock which forms the links. 4. The severing of this stock into links of predetermined length. 5. The initial bending down of the severed link stock into the shape shown in Fig. 20. 6. The further bending of the link into the shape shown in Fig. 21. 7. The further bending of the link and attaching one of its ends to the band as shown in Fig. 22. 8. The severing of the band tape at predetermined intervals so as to successively form bands, each of a predetermined length. 9. The simultaneous formation of apertures adjacent the severed ends of the bands.

In addition to the above enumerated operations there are various minor functions and mechanisms, the properties of which will appear in the detail description of the general formation and operation of the machine.

Taking up first in detail the formation of the link receiving apertures it will be noticed that the band tape 3 in being fed from the reel 4 to the operating mechanism on the bed 2 first passes through a straightening device 5 and through the latter until it reaches the plane of the punch mechanism 6 which forms the apertures adapted to receive the connecting links. As shown in Fig. 13 a plurality of these apertures 8 are formed along the edge 9 of the band 3 at predetermined intervals, the stock being fed forward by a longitudinal reciprocation of the punch element itself in addition to the vertical reciprocation which stamps out the metal to form the apertures. In general, the punch is mounted on a reciprocating carriage or bed 10, which bed after the punch element 11 has been moved downward through the band is adjusted forward along the bed plate 2, and moves forward a distance exactly equal to the length required between the adjacent link receiving apertures. Then at its extreme forward movement the punch element 11 is reciprocated upward out of engagement with the band and while in this inoperative position the carriage 10 is returned to its initial position toward the rear end of the bed plate where it starts a new cycle of operations. The mechanism for imparting reciprocating motion to the carriage 10 comprises a main drive shaft 12 driven by a belt wheel 13 from a suitable power source in the usual manner. At one end the shaft 12 is provided with a pinion 14 meshing with a gear 15 mounted within the housing 16. The gear 15 in turn is mounted on a cam shaft 17 and upon the latter is a feed cam 18 which upon each revolution of the cam shaft 17 rocks an arm 19, centrally pivoted at 20, and which has its opposite end 21 abutting against an anti-friction roller 21' carried by the carriage 10 so that upon rocking movement of the arm 19 the carriage 10 will be reciprocated longitudinally of the main bed 2 of the machine. Arm 19 is returned to normal by means of the spring 19' coöperating with the anti-friction roller.

In order to avoid the formation of a link receiving aperture 8 adjacent the severed ends 22 of the various bands the following mechanism is employed, which secures this result without interfering with the regular reciprocation of the punch elements as described in the preceding paragraph. The avoiding of the formation of a link receiving aperture at that portion which will be adjacent the severed ends is produced by the action of an auxiliary carriage 23 slidably mounted on the reciprocating carriage 10 and caused at predetermined intervals to carry the punch 11 back a greater distance than that of its normal throw. That is, for illustration, fourteen of the apertures will be formed in the band at equal distances apart while between the fourteenth and fifteenth apertures the auxiliary carriage will be brought into operation and carry the punch back an additional distance so that between the fourteenth and fifteenth apertures there will be a relatively long space left. The stock from which the bands are formed is then severed intermediate the last mentioned apertures.

In the present instance I have shown and described a pneumatically operated means for causing the reciprocation of the auxiliary carriage at the proper intervals. Leading from a suitable source of compressed air is an air inlet conduit 24 which supplies air under pressure to the valve casing 25. This valve controls the passage of the air to the flexible pipes 26 and 27 so that at the proper interval air will be admitted from the source of supply through the flexible pipe 26 to the left hand side of a piston 28. This piston is connected in turn to the auxiliary carriage 23 so that upon air being admitted to the left hand side of the piston 28, the latter will be forced toward the right and will adjust the auxiliary carriage and cause the latter together with the punch to move an additional distance, besides the normal reciprocation given to the carriage 10. The limit of movement of the auxiliary carriage is governed by an adjustable stop 29. Thus when the auxiliary feed has been brought into operation the punch will have been carried back the distance of the normal reciprocation of the main carriage 10 plus the additional movement produced by the action of the piston 28 on the auxiliary carriage 23. The carriage 10 is then adjusted back toward the left, that is, is moved forward its usual amount while in addition, the valve in the casing 25 having been adjusted to close communication between the source of air and the flexible pipe 26 and open communication between the source of air and the flexible conduit 27, the air coming in on the right hand side of the piston 28 will push the same toward the left so that when the punch is drawn out of engagement with the edge band the latter will have been fed forward an extra length.

The detailed construction and operation of the valve in the casing 25 (which is shown in Figs. 14, 15, 16 and 17) is as follows: Leading from one side of the valve casing 25 is a passageway 29 opening into the casing through a port 30. This passageway is in open communication with the flexible conduit 26 while its port 30 is controlled by the rotary adjustment of the valve disk 31, the compressed air being admitted into the casing on the opposite side of this valve disk. The latter has a port 32 adapted upon each complete rotation of the valve to register with the port 30, thus allowing the compressed air to flow through the registering ports 32 and 30, the passageway 29 and the flexible conduit 26 to the left hand side of the piston, moving the latter and the auxiliary carriage 23 an additional distance toward the right.

Shortly after the port 32 moves out of registration with the port 30, the latter is open to the exhaust channel 33 which connects by means of a radial channel 34 with the exhaust pipe 35 formed in the hollow valve stem 36. This stem projects out through the casing 25 and is provided with a ratchet wheel 37. The latter in turn is operated by an eccentric 38 mounted on the shaft 17, this eccentric through the action of the ratchet dogs 39 and 40 causing a feed equal to two of the teeth on the ratchet wheel for each revolution of the shaft 17. Thus if the ratchet wheel 37 is provided with thirty teeth the valve 31 will make one complete revolution for each fifteen revolutions of the shaft 17. Since one of the link receiving apertures is formed for each revolution of the shaft 17, the additional spacing caused by the extra throw of the auxiliary carriage will be brought about after fourteen link receiving apertures of normal spacing have been produced. (It is of course, understood that the feed may be changed to increase and decrease the number of normally spaced apertures between the intervals of the extra feed).

After the auxiliary carriage 23 has been moved to the left in the manner just above described and the portion of the chamber on the left hand side of the piston 28 has been opened to exhaust, the portion of the chamber to the right of the piston 28 is opened to the source of compressed air supply by registration of the channel 41 with the port 42, which, through the passageway 43 connects with the flexible conduit 27. This channel 41 extends substantially around the disk valve so that the piston 28 is normally forced toward the left. When however the ports 30 and 32 are in registration so that air pressure is exerted on the left hand side of the piston the port 42 is open to exhaust by its registration with the exhaust port 44, which in turn is connected by a radial channel 45 to the exhaust pipe.

Figure 5:
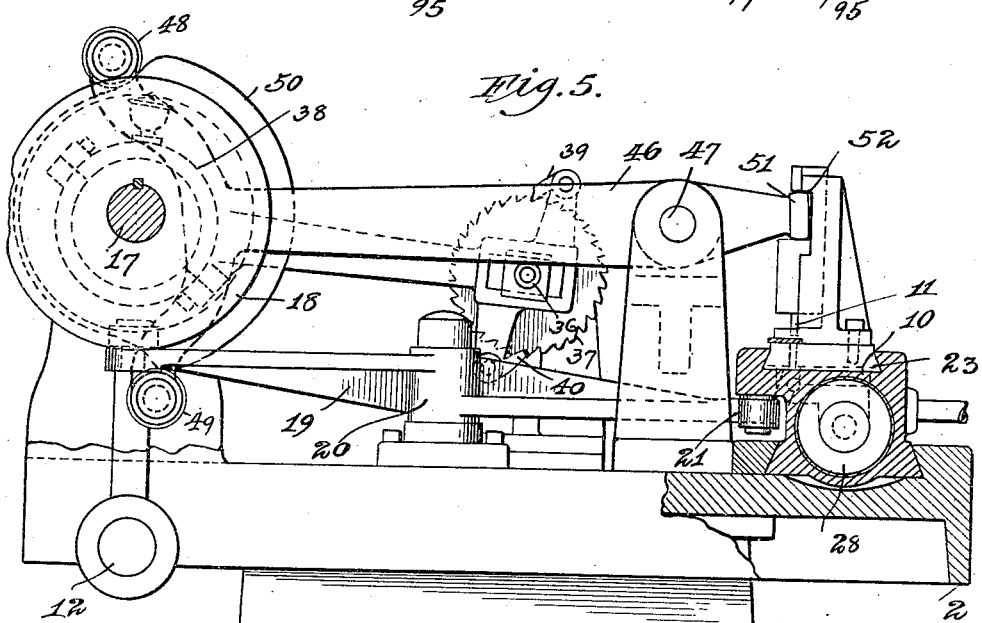
Fig. 5 is an enlarged cross section on the line 5—5 of Fig. 1.
Figure 14:
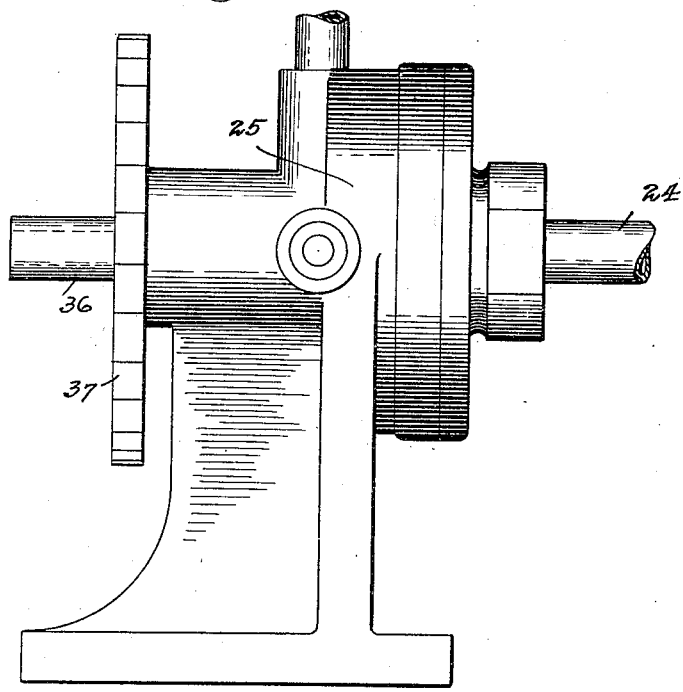
Fig. 14 is a side elevation of the valve mechanism controlling the pneumatic action of the auxiliary carriage.
Figure 15:
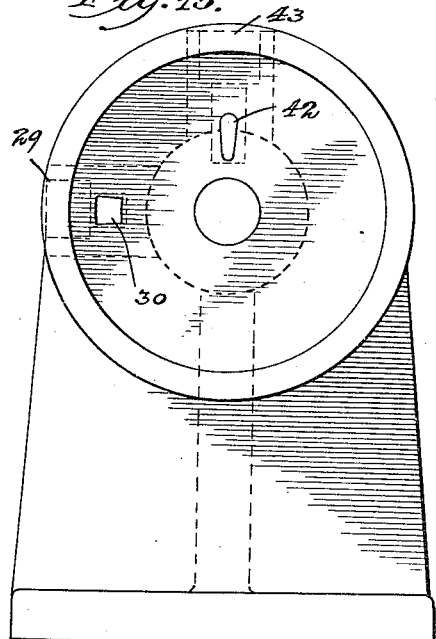
Fig. 15 is a end elevation of the casing, the valve being removed.
Figure 16:
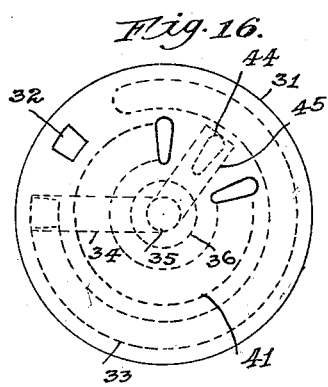
Fig. 16 is an end view of the valve controlling the ports of the casing shown in Fig. 15.
Figure 17:
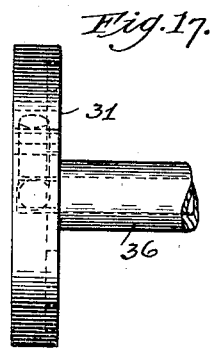
Fig. 17 is an edge view of the valve shown in Fig. 16.

At the extreme ends of its longitudinal reciprocation, the punch has a vertical reciprocation imparted to it by means of an arm 46 which is pivoted at 47 and has a pair of rollers 48 and 49 operated upon by a cam 50. The opposite end of the arm 46 is provided with a transverse bar member 51 fitting in a groove 52 of the punch mechanism. In the position of the parts shown in Fig. 5, the punch is raised and owing to the action of the cam on the lower roller 49 will remain in this position during that time in which the punch mechanism is moving back toward the right of the machine. When, however the punch reaches its extreme adjustment toward the right the enlarged portion of the cam 50 acting on the upper roller will rock the lever 46 about its pivot and force the punch down through the band, and will hold it in this position while it is feeding forward, thus utilizing the punching element as the feeding means for advancing the band the exact distance.

Simultaneously with the formation and forward feeding of the band the stock for the links is fed forward and severed into the desired lengths and the links formed and attached to the band. The wire 53 is fed from a reel or other suitable source of supply through the wire straightener 54 to the link severing and forming mechanism by means of a feeding mechanism which comprises an eccentric cam 55 mounted on the shaft 17 and adapted by rocking the arm 56 to shift forward the slide block 57 on the slideway 58 and at the same time forcing the wire clamp 59 down into gripping engagement with the wire so as to feed it forward with the slide block. However, upon the return movement the clamp member 59 is released so that the slide block returns to the left without retracting the wire. When the wire has been fed forward a distance sufficient to make one of the links, it is acted upon by three reciprocating punch members 61, 62 and 63, each of which is normally held upward in inoperative position by the respective springs 64, 65, and 66. The first mentioned punch member serves to sever the wire into a length 67 and by forcing the ends down over the bending dies 70 to initially bend down the ends 68 and 69 of the length 67. Vertical reciprocation of the shearing punch is produced by the action of a rock arm 71 which is pivoted at 72 and has one end operatively connected to the shearing punch while its opposite end is raised and lowered by the action of a cam 73 fixed to the shaft 17.

The second punch member 62 is called the bending punch and is also mounted for vertical reciprocation and after the wire is severed into the proper length and the initial bends of the ends 68 and 69 produced, the link is bent into the shape shown in Fig. 21 by the downward movement of the bending punch 62. In turn this bending punch is caused to move downward by the action of a rock arm 74, one end of which is operatively connected to the bending punch while its opposite end is raised and lowered by the action of a cam 75 mounted on the cam shaft 17. After the link has been bent into the shape shown in Fig. 21 its end 68 is forced through one of the link receiving apertures 8 formed in the edge band and the link and band at this stage of operation are positioned just above the bending die block 76 which is provided with recess seats 77 and 78. The closing punch 63 is then forced downward by the cam 63ª on shaft 17, acting through the pivoted lever 63ᵇ, and the bent ends of the links pushed against the seats 77 and 78 so as to completely close the end 68 against the main portion of the link and to partially close the end 69. Thus, the link while being formed is automatically inserted and fastened to the edge band while the end which is to engage the fabric loops (as shown in Fig. 22) is partially closed.

Therefore, in assembling the bed spring it is only necessary to hook the end 69 of the link into the proper fabric loop 79 and press the end 69 against the main portion of the link. It will be noticed that in the assembled position of the links their outer ends are forced directly against the main body of the link and thus any danger of a protruding end which would tear the bed clothing is avoided.

The next and last operation of the machine comprises the severing of the stock which forms the edge bands, and to which the links have been attached, into bands of proper length and to simultaneously punch one or more apertures 80 adjacent the severed end. As previously mentioned the line where the band is severed is intermediate the link receiving apertures which are spaced apart a greater distance than the remaining apertures.

This severing and punching mechanism comprises a die bed plate 81 within which is positioned a pair of removable die members 82 and 83, the latter being preferably reversible. That is, each of the die plate members 82 and 83 is provided with cutting recesses 84 and 85 and apertures 86 and 87. Only the portions which are positioned near the center are engaged by the punch 88 when the latter is reciprocated downward. Therefore, in case the die plate member in use becomes dull, a new cutting edge can be presented by simply reversing the position of the die plate members. The punch 88 which coöperates with the die plate members has an irregular shaped cutting member 89 and four projecting circular punches 90 which correspond with the apertures 86 and 87 formed in the die plate members. Thus, the downward movement of the punch member 90 will sever the stock into a plurality of bands, cut off curved edge portions 91 of the latter and simultaneously form in each of the adjacent ends a pair of apertures 80 which are used to receive the helical springs 92 that connect the edge band to the frame.

The mechanism which reciprocates the punch member 90 comprises a rock arm 93 having one end operatively connected to the punch member while its opposite end, that is, the end on the opposite side of the pivot 94 is raised and lowered by the action of an eccentric cam member 95. However, inasmuch as the cam member is driven from the main cam shaft 17 and it is only desired to operate the band shearing punch once for every fifteen revolutions of the cam shaft, means are provided for regulating the operation as follows: The eccentric 95 is loosely sleeved upon the cam shaft 17 adjacent the fixed collar 96 and is adapted to be clutched thereto whenever the pin 97 is permitted to extend into the slot 98 in the fixed collar. This pin is pressed toward the collar by a spring 99 but is normally prevented from extending into the slot by a shoe 100 mounted on one end of a crank arm 101 which is pivoted at 102 and provided at its opposite end with a roller 103. A spring 104 tends to normally withdraw the shoe out of operative position but is prevented from doing so by the action of a notched disk 105. Secured to the disk 105 is a ratchet wheel 106, the teeth of which are engaged by a dog 107 operatively connected to the slide block 57. Thus as the latter reciprocates back and forth, the ratchet mechanism moves the disk 105 one-fifteenth of a complete revolution until the deep notch 108 comes into registration with the roller 103. This releases the pressure on the roller 103 and allows the crank arm 101 under the action of the spring 104 to move the shoe out of operative position and permit the clutch pin to lock the eccentric to the collar. The eccentric then makes one complete revolution with the collar and by rocking the arm 93 forces the shearing punch 88 down to sever the band at the proper time in the cycle of operations.

The various mechanisms and operations described comprise the general elements and functions of the machine but in addition I have provided means for automatically stopping the machine when the feed of either the band or the wire is other than normal. The main shaft of the machine is connected to the pulley by means of a friction clutch 110 which can be manually drawn into and out of operation by shifting the member 111, or automatically drawn out of operation by the retraction of the arm 112 when the solenoid 113 is energized. The energizing of this solenoid whenever the band buckles is automatically produced by the rotation of the movable contact member 114. This contact member is carried by a shaft 115 loosely sleeved in the bearing 116 and provided at one end with a slotted shoe 117. The band will normally pass through the slotted shoe without rocking the shaft 115 upon its axis but should the band buckle or become twisted it will rock the shaft 115 axially and adjust the movable contact member 114 into engagement with one of the stationary contact members 118, thus closing the circuit to the solenoid. The energizing of the latter will automatically shift the clutch out of engagement and stop the operation of the machine.

The same solenoid is employed for shutting off the machine whenever the supply of tape is exhausted. In passing from the reel 4 to the wire straightener 5 the stock for the band passes between a pair of contacts 120 and 121 and normally holds the latter up out of engagement with the former. If however, the supply of stock becomes exhausted, the arm 122 on which the contact 121 is mounted will by the force of gravity drop down and bring the contacts into engagement, closing the circuit and energizing the solenoid to automatically shut off the operation of the machine.

Similar means are provided for stopping the operation of the machine whenever the supply of wire to the link forming mechanism is exhausted and comprises the stationary contact 123, a movable contact 124 mounted on an arm 125 and normally held out of engagement by the wire holding the arm up against the force of gravity. If however, the supply of wire is exhausted the gravity actuated arm will move the contacts into engagement closing the circuit and energizing the solenoid so as to release the clutch as described in connection with the automatic control of the band stock.

From the above description it will be noticed that after the operator has supplied the necessary reels or other amount of stock for the link and bands, the entire formation of the bands, links and their assembly is automatically produced and will continue as long as the machine is operating in its normal manner. It is therefore possible for each operator to take care of a number of machines and greatly reduce the labor cost in producing bed springs of this type. It is of course understood that various changes in the details of construction and in the arrangement and combination of parts can be made by those skilled in the art without departing from the scope of this invention and I therefore do not desire to limit the latter except as specified in the appended claims.

I claim as my invention:

1. In a machine for making edge bands the combination with means for forming an elongated flat edge band, of means for forming a series of spaced apertures throughout the length of the band and means associated therewith for automatically securing fabric links to said band.

2. In a machine for making edge bands or the like, the combination with means for forming a series of link receiving apertures throughout the length of a plurality of elongated flat edge bands, of means for automatically attaching fabric links to the apertures in said bands.

3. In a machine for making edge bands or the like, the combination with means for severing the stock into a plurality of edge bands, means for forming a plurality of links and means for attaching said links to said bands.

4. In a machine for making edge bands or the like, the combination with means for severing the stock into a plurality of edge bands, means for forming link receiving apertures in said bands, means for forming a plurality of links, and means for attaching said links to said bands through the link receiving apertures.

5. In a machine for making edge bands or the like, the combination with means for forming a series of link receiving apertures spaced at predetermined intervals throughout the length of a flat edge band, of means for forming links and means for applying the link through the aperture in the edge band.

6. In a machine for making edge bands or the like, the combination with means for severing a strip into a plurality of edge bands, of means for automatically forming link receiving apertures in said bands at predetermined distances apart, means for preventing the forming of a link receiving aperture adjacent the several ends of the band, and means for automatically attaching links to said bands.

7. In a machine for making edge bands or the like, the combination with means for severing the stock into a plurality of edge bands, of means for severing a wire stock into a plurality of links and automatically forming said stock into links, each having a return bent end and an inwardly extending top, and securing said links to the edge bands.

8. In a machine for making edge bands or the like, the combination with mechanism for forming link receiving apertures in an edge band, of means for utilizing said mechanism as a feeding mechanism for the band being operated on, and means for attaching links to said band as formed.

9. In a machine for making edge bands, the combination with means for feeding forward flat blank stock, means for forming said stock into a plurality of edge bands, means for forming a series of apertures throughout the length of each band, means for severing wire stock into a plurality of links and automatically bending down the tops of the links at the time they are severed, and means for attaching such links to the apertures in said band.

10. In a machine for making edge bands, the combination with means for feeding forward an edge band, of means for providing a series of spaced apertures in the intermediate portion of said band and means for automatically attaching links to the apertures in said band.

11. In a machine for making edge bands, the combination with means for forming a plurality of apertures in an edge band at points remote from the ends of the band, of means for automatically attaching links to the apertures in said band.

12. The method of forming a link and attaching it to an edge band, comprising forming link receiving apertures at predetermined intervals in the length of the band, simultaneously severing wire stock into blanks, bending the ends of the blank to form eye portions and automatically attaching one eye of the link through the corresponding aperture formed in the band, and forcing the upper end of the side eye into close engagement with the body of the link.

13. In a machine for making edge bands or the like, the combination of means for forming link receiving apertures in the band material, means for feeding the band material forward, means for feeding wire stock and severing the same into links of predetermined length, means for initially bending the links, means for further bending the links and attaching them to the band through the apertures formed therein, and means for severing the band material at predetermined intervals, and simultaneously forming apertures adjacent the severed ends of the bands.

14. In a machine for making edge bands or the like, the combination of means for forming link receiving apertures in the band material, means for feeding the band material forward, means for feeding wire stock and severing the same into links of predetermined length, means for initially bending the links and attaching them to the band through the apertures formed therein, and means for severing the band material at predetermined intervals.

15. In a machine for making edge bands or the like, the combination of means for forming link receiving apertures in the band material, means for feeding the band material forward, means for feeding wire stock and severing the same into links of predetermined length, means for bending the links and attaching them to the band through the apertures formed therein, and means for forming apertures adjacent the ends of the bands.

16. In a machine for making edge bands or the like, the combination of means for forming link receiving apertures in the band material, means for feeding wire stock and severing the same into links of predetermined length, means for initially bending the links, means for further bending the links and attaching them to the band through the apertures formed therein, and means for severing the band material into bands of predetermined length.

17. In a machine for making edge bands or the like, the combination of means for forming link receiving apertures in the band material, means for feeding wire stock and severing the same into links of predetermined length, means for bending the links and attaching them to the band through the apertures formed therein and means for severing the band material into bands of predetermined length.

18. In a machine for making edge bands or the like, the combination of means for forming link receiving apertures in the band material, means for feeding wire stock and severing the same into links of predetermined length, means for bending the links and attaching them to the band through the apertures formed therein, means for severing the band material into bands of predetermined length, and means for forming additional apertures adjacent the ends of the bands.

19. In a machine for making edge bands or the like, the combination of means for forming link receiving apertures in the band material, means for feeding wire stock and severing the same into links of predetermined length, means for initially bending the links, means for further bending the links and attaching them to the band through the apertures formed therein, means for severing the band material into bands of predetermined length, and means for automatically stopping the machine when the supply of band material is exhausted.

20. In a machine for making edge bands or the like, the combination of means for forming link receiving apertures in the band material, means for feeding wire stock and severing the same into links of predetermined length, means for initially bending the links, means for further bending the links and attaching them to the band through the apertures formed therein, means for severing the band material into bands of predetermined length, and means for automatically stopping the machine when the supply of wire stock is exhausted.

21. In a machine for making edge bands or the like, the combination of means for forming link receiving apertures in the band material, means for feeding wire stock and severing the same into links of predetermined length, means for initially bending the links, means for further bending the links and attaching them to the band through the apertures formed therein, means for severing the band material into bands of predetermined length, and means for automatically stopping the machine when the supply of either band material or wire stock is exhausted.

22. In a machine for making edge bands or the like, the combination of means for punching link receiving apertures in edge band material, means for utilizing the aperture punching mechanism for feeding the band material forward, means for feeding wire stock, means for severing the wire stock into predetermined lengths, means for partially bending the wire lengths into links, and means for attaching one end of said links to said band through the apertures formed therein.

23. In a machine for making edge bands or the like, the combination of means for punching link receiving apertures in edge band material, a reciprocating mechanism carrying said punching means and adapted to thereby feed the material forward, means for severing wire stock into predetermined lengths, means for bending the lengths and attaching one end thereof to the band material, means for bending the other end of the wire length into partially closed position, and means for severing the band material into predeterimed lengths.

24. In a machine for making edge bands or the like, the combination of means for punching link receiving apertures in edge band material, a reciprocating mechanism carrying said punching means and adapted to thereby feed the material forward, means for severing wire stock into predetermined lengths, means for bending the lengths and attaching one end thereof to the band material, means for bending the other end of the wire length into partially closed position, and means for severing the band material into predetermined lengths, each of said band lengths having a predetermined number of the links attached thereto.

25. In a machine for making edge bands or the like, the combination of means for punching link receiving apertures in edge band material, a reciprocating mechanism carrying said punching means and adapted to thereby feed the material forward, means for severing wire stock into predetermined lengths, means for bending the lengths and attaching one end thereof to the band material, means for bending the other end of the wire length into partially closed position, and means for severing the band material into predetermined lengths, and simultaneously with the severing operation forming additional apertures adjacent one end of each of the bands.

JOHN F. GAIL.

Copies of this patent may be obtained for five cents each, by addressing the "Commissioner of Patents, Washington, D. C."